May 21, 1968     W. C. FINK ET AL     3,384,441

PHOTOFLASH LAMP

Filed Dec. 29, 1966

WILLIAM C. FINK
HOWARD S. PAINTER
INVENTORS

BY Joseph C. Ryan
ATTORNEY

United States Patent Office 3,384,441
Patented May 21, 1968

3,384,441
PHOTOFLASH LAMP
William C. Fink, Williamsport, and Howard S. Painter, Linden, Pa., assignors to Sylvania Electric Products Inc., a corporation of Delaware
Filed Dec. 29, 1966, Ser. No. 605,841
5 Claims. (Cl. 431—95)

This invention relates to the manufacture of photoflash lamps and more particularly to photoflash lamps which are very small in size and which are characterized by a flash duration many times longer than the flash duration which characterizes the more popular photoflash lamps used by the average amateur photographer.

Most of the photoflash lamps used by the average amateur photographer have a flash duration of between about 25 to 50 msecs. For example, Press 25's have a duration of nearly 50 msecs., whereas M2's have a flash duration of about 30 msecs. The lamp envelope in both of these types is a blownbulb. On the other hand, in the case of AG1's for example, the envelope of which is drawn tubing, the flash duration is about 40 msecs.

In recent years, certain special photoflash lamps have been made available for certain special applications. For example, photoflash lamps having a flash duration of several seconds are available and are particularly advantageous for high speed motion picture photography for example. Lamps of this type are shown in U.S. Patents 2,955,447, 3,002,367 and 3,063,277 for example. However, as these patents disclose, the lamp envelope is a large blown glass bulb. Although the size of the bulb may not be a significant factor insofar as the commercial or professional photographer is concerned, particularly when it fills a definite need, such is not the case insofar as the amateur photographer is concerned. This auxiliary light source is too big and too expensive.

The increasing popularity of certain new camera types has created a need for a small, substantially tubular, long duration photoflash lamp which could be made available at a reasonable cost. The provision of such a lamp is one of the principal objects of this invention.

In attempting to provide a very small, tubular-shaped, photoflash lamp having a flash duration of several hundred milliseconds, it was found that, due to the change in size and shape of the lamp envelope, the techniques employed heretofore for supporting the combustible, such as disclosed in the patents referenced above for example, were not readily applicable and could not be employed. Basically there are two reasons for this, viz, the absence of a substantial mount structure and the absence of a uniformly contoured top of the lamp envelope, from either of which the long-duration combustible could be supported. Since the overall length of the lamp envelope is not great, the provision of a substantial mount structure adequate to support the long-durtion combustible is not practical, one of the reasons being that it would occupy so much of the available space within the lamp envelope that not enough space would be left for the combustible. Because of the manufacturing techniques involved and the sequence of manufacturing operations in the manufacture of subminiature tubular flashlamps, the top of the lamp envelope is the last to be shaped and it is drawn down to an exhaust tip. Thus this locus is not available as a mounting surface to support the long-duration combustible.

The foregoing and other problems have been resolved and the provision of a subminiature, long-duration flashlamp has been made possible by a novel foil suspension system, two embodiments of which are illustrated in the accompanying drawing and described in detail below.

Figure 1:
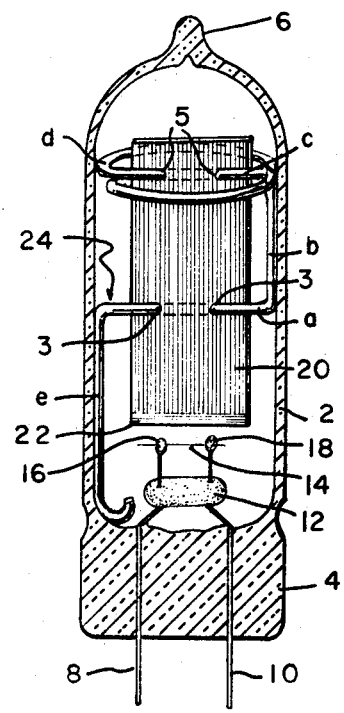
FIGURE 1 illustrates one embodiment of the subminiature long-duration photoflash lamp of our invention.

In the FIGURE 1 embodiment, the lamp comprises an hermetically sealed lamp envelope 2 of glass tubing having a press 4 defining one end thereof and an exhaust tip 6 defining the other end thereof. Supported by the press 4 is an ignition system or mount structure comprising a pair of lead-in wires 8 and 10 extending through the press and maintained in spaced relationship within the lamp envelope by the bead 12. Filament 14 spans the inner ends of the lead-in wires and beads of primer 16 and 18 are located on the inner ends of the lead-in wires 8 and 10 respectively at their junction with the filament. The lamp envelope 2 has an O.D. of less than one-half inch, an overall length of about one and one-half inches, an internal volume of about 2 ml. and a filling of combustion-supporting gas, principally oxygen for example, at several atmospheres pressure. The combustible is a strip of magnesium foil 20, preferably about 5–7 mils thick, and having a strip 22 of zirconium paste secured thereto at the lower end thereof, in close proximity to but spaced from the primer beads 16 and 18 in order to facilitate combustion. Alternatively, a small quantity of shredded zirconium foil could be located between the top of the mount structure and the bottom of the strip 20 to serve the same purpose.

The tubular lamp envelope 2 with the press 4 defining one end thereof supports the strip of magnesium foil 20 on a molybdenum wire frame 24. A 10 mil diameter molybdenum wire is shaped and threaded through apertures provided therefor in the foil 20 to define the frame 24. The foil 20 is provided with a pair of holes 3 disposed on opposite sides of the longitudinal axis thereof and slightly below the center thereof, and another pair of holes 5 disposed on opposite sides of the longitudinal axis thereof and near the top thereof. The wire which is shaped to define the frame 24 comprises intermediate segments a, b and c and end segments d and e. Intermediate segments a and c extend through the lower pair of holes 3 and the upper pair of holes 5 respectively and are substantially perpendicular to the longitudinal axis of the lamp envelope. Intermediate segment b is substantially perpendicular to segments a and c, connects them to one another and extends along the inside wall of the lamp envelope. End segment d is substantially in the form of a helical coil following the contour of the inner wall of the lamp envelope. End segment e is substantially straight, being perpendicular to intermediate segment a, extending along the inside wall of the lamp envelope and terminating in a curved end shaped to conform somewhat with the curved surface defined by the junction of the lamp envelope with the press which defines one end thereof.

Figure 2:
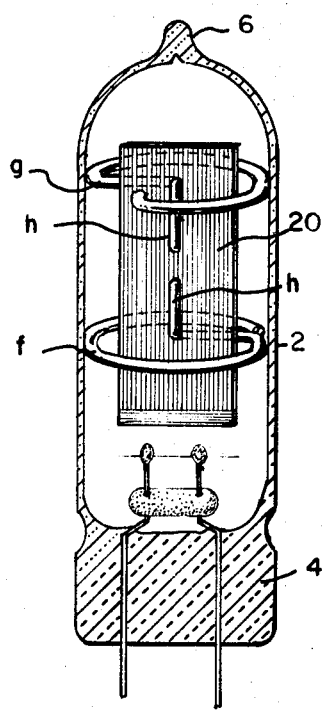
FIGURE 2 illustrates another embodiment of the subminiature, long-duration photoflash lamp of our invention.

In the FIGURE 2 modification, the basic lamp structure illustrated therein is the same as in the FIGURE 1 modification and thus the same reference numbers have been assigned to corresponding parts. However, the molybdenum wire frame 24 which supports the strip of magnesium foil 20 is shaped differently in FIGURE 2 than in FIGURE 1. In the FIGURE 2 modification, both end segments f and g are substantially in the form of a helical coil following the contour of the inner wall of the lamp envelope. The intermediate segment h is substantially straight, extends substantially parallel to and along the longitudinal axis of the foil and is threaded therethrough at several points.

What we claim is:
1. A photoflash lamp comprising:

an hermetically sealed, substantially tubular lamp envelope;

an ignition system supported in said envelope at one end thereof;

a strip of combustible foil disposed in said envelope; and a wire frame for supporting said strip, said wire frame being in frictional engagement with the inner wall of the lamp envelope and thus supported thereby.

2. The combination of claim 1 in which the wire of said wire frame is threaded through apertures provided therefor in said foil.

3. The combination of claim 1 in which at least one end of said frame is in the form of a helical coil.

4. The combination of claim 1 in which both ends of said frame are in the form of helical coils.

5. The combination of claim 1 in which one end of said frame is characterized by a substantially straight segment extending along the inside side wall of the lamp envelope and terminating in a curved end shaped to conform substantially to the shape of the inside face of the end of the lamp envelope.

References Cited
UNITED STATES PATENTS 3,303,674    2/1967    Anderson _____ 67—31

JAMES W. WESTHAVER, *Primary Examiner.*